Patented Jan. 3, 1933

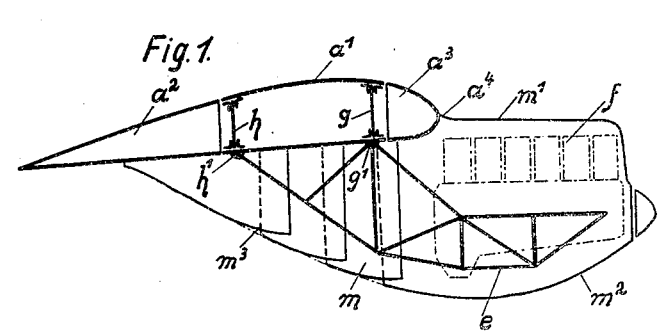
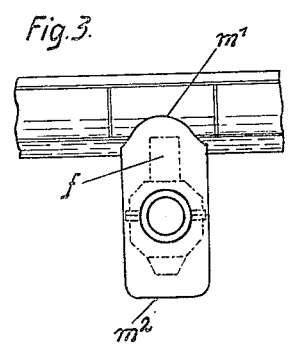
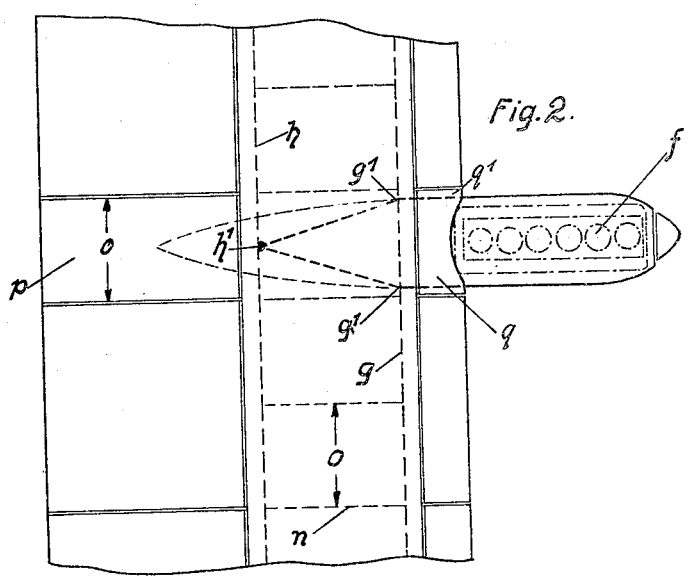
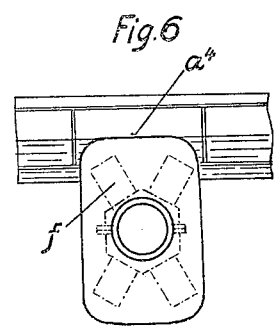
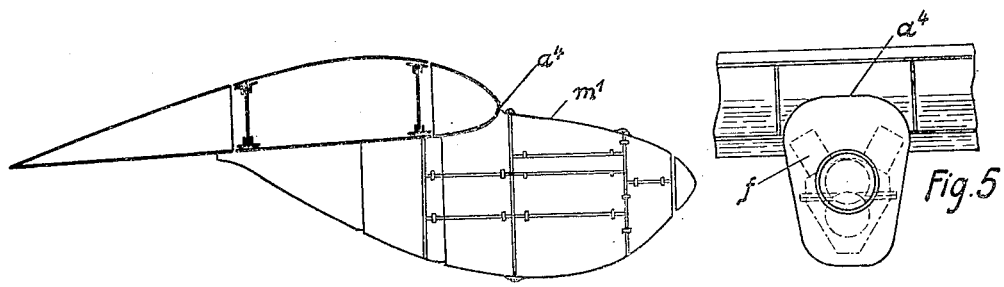
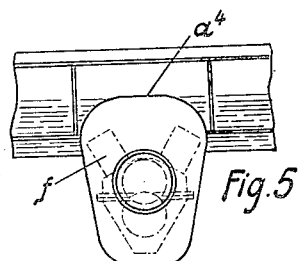

1,893,001

UNITED STATES PATENT OFFICE

ADOLF ROHRBACH, OF BERLIN, GERMANY, ASSIGNOR TO ROHRBACH PATENTS CORPORATION, A CORPORATION OF DELAWARE

ARRANGEMENT OF ENGINE ON AIRCRAFT

Original application filed September 4, 1926, Serial No. 133,652, and in Germany April 23, 1926. Divided and this application filed August 4, 1928. Serial No. 297,441. Renewed November 10, 1931.

This application is a division of my application Serial No. 133,652 filed September 4th, 1926.

The object of the invention is a simplified structural arrangement wherein the resulting moment of inertia of the supporting frame is sufficiently large to allow of only one connection being provided for the latter, in the wing bottom surface. The lowered position of the supporting frame further permits to so arrange an engine with cylinders in line, that the upper nacelle wall begins precisely at the vertex of the leading edge of the wing. A connection of marked structural facility and statical determination is obtained with a three-point suspension of the supporting frame, said three points forming an isosceles triangle with its base adjacent or facing the engine.

With the new form of supporting arrangement the ratio of length to height offers some inconvenience with regard to air flow conditions. This disadvantage can be counteracted by so developing the cone surface shaped tapered nacelle part, which is turned away from the engine, that it merges into the wing surface at a somewhat greater distance from the frame suspension connections whereby confluence or gradual joinder of the air flows or threads is obtained in a particularly satisfactory manner.

A further improvement consists in the walls of the engine nacelle having nozzles which extend towards the nacelle interior part. Those nozzles are used mainly for ventilation purposes; at the same time, however, they create favorable air flow conditions, by preventing interruption of the flow in the way of the slots in slotted wings, such interruption often occurring with the new nacelles and their partly much curved outer surfaces.

For a better understanding of the above indicated novel features of the invention and others which will hereinafter appear, reference may be had to the accompanying drawing illustrating several embodiments thereof, wherein Fig. 1 is a vertical longitudinal central section through first form of construction, Fig. 2 is a plan view, Fig. 3 is a front elevation, Fig. 4 is a side elevation and Fig. 5 a front elevation of the second form of construction, whilst Fig. 6 is a front elevation of the third form of construction.

According to Figs. 1–3 a supporting frame $e$ composed of struts, carries a single-serial engine $f$ on a bed which is arranged so low that an upper part $m^1$ of the separate cowling $m$ passes over into the leading edge $a^3$ of the wing at or in the proximity of the central convergency point $a^4$. The cowling $m^1$ extends parallel to the cylinder heads as a result of the lateral arrangement of the exhaust pipes.

The supporting frame $e$ owing to the greater moment of inertia is only attached to the lower edges of two side longitudinal stays $g$ and $h$ of a box girder central wing portion at two points $g^1$ in the stay $g$, and at one point $h^1$ in the stay $h$. Two points which are so close to one another that the frame work tapers to the rear may also be chosen instead of this one point.

The front portion of the lower cowling $m^2$ of the engine nacelle is parallel to the wing and gradually passes over towards the rear into a conical form, the apex of which is located approximately in the centre of the trailing edge $a^2$, i. e. considerably to the rear of the points of attachment $h^1$. This construction is for the purpose of allowing the currents of air flowing over the nacelle to converge smoothly into one another. Apertures $m^3$, the walls of which are adapted to the stream-line shape of the nacelle at their points of emergence, are provided in the rear portion of the cowling for ventilating the interior of the nacelle. In this way the disturbance of the air flow caused by the projection ventilating ports and the like usually provided, is thus avoided.

In the modification shown in Figs. 4 and 5 the engine is mounted so low that the upper cowling $m^1$ of the nacelle inclines downwardly towards the front. Fig. 4 also shows for example, the division of the covering of the nacelle into separate sections mounted in hinges through which the different parts of the power unit are accessible. The latter consists, as can be seen from Fig. 5, of an engine $f$ having cylinders arranged in two lines or in the form of a V. This, similarly as in the modification shown in Fig. 6 having an engine having cylinders arranged in four lines or in the form of a double V or an X, gives a flat surface for the upper cowling which passes over into the convergency point $a^4$ of the wing over the extent of a line, whereas, according to Figs. 1–3, the transition theoretically takes place over merely a point.

If the wing consists, as is for example shown in Figs. 1–2, of a central main supporting element $a^1$, which is preferably constructed in the form of a box girder, of two longitudinal stays $g$ and $h$ and transverse members $n$ connecting them at regular intervals and of removable front and rear tip elements which are subdivided in the direction of the wing span corresponding to the arrangement of the transverse members, then the arrangement is made such that the distance $o$ between the transverse members or the length $c$ of the edge elements $p$ and $q$ and the width of the supporting frame work or the nacelle are adjusted to one another. The power unit including the edge elements, the shape of which is affected by it, can then be easily introduced into the system of wing division showing a certain regularity. If the width of the nacelle and the length of the edge element $q$ do not exactly agree, the nacelle is then provided with short side caps $q^1$ extending in the direction of the leading edge. The edge elements located laterally of the power unit are of a length which is a multiple of the length $o$.

What I claim is:

1. In an airplane a lifting wing consisting of a frame and a covering therefor, a supporting frame suspended from the bottom surface of the said wing and extending in the direction of flight, one end of said supporting frame protruding beyond the wing edge and forming the engine bed, the protruding part being so disposed, that the engine is substantially located below the level of the wing chord, the supporting frame being directly and exclusively attached to the wing frame in the plane of the bottom surface, a special streamlined nacelle for the engine and supporting frame fairing into the wing skin, and so attached as to be easily removable, the part of the nacelle situated in beyond the wing edge fairing into the vertex of the latter.

2. In an airplane a lifting wing consisting of a frame and a covering therefor, a supporting frame suspended from the bottom surface of the said wing and forming one united independent body, one end of said supporting frame protruding beyond the wing edge, said protruding end forming the engine bed and being disposed at an elevation such that the engine is substantially located below the level of the wing chord, the supporting frame unit being directly and exclusively attached to the bottom surface of the wing frame, a special streamlined nacelle for the engine and supporting frame fairing into the wing skin and so attached as to be easily removable, the upper part of the nacelle situated in beyond the wing edge fairing into the vertex of the latter.

3. An airplane of the character set forth in claim 2, wherein the part of the supporting frame forming the engine bed, lowered and located beyond the wing is substantially parallel to the connecting plane of the motor support with the wing and edge is designed to accommodate an engine with cylinders in line, the upper part of the detachable nacelle fairing into the vertex of the wing edge and having essentially the same incidence as the wing.

4. A nacelle for an aircraft motor comprising two interconnected side girders constituting a frame, forming a one-piece body and having three connection points, said connection points forming the angles of an isosceles triangle and adapted to be connected with the corresponding points of a wing bottom surface, the bed or base accommodating the engine extending from said connecting points in the direction of flight, said bed being disposed at such level that the engine is located substantially below the level of the said three connecting points, and a covering for the motor and motor support said covering being readily removable and constituting with the girder frame a nacelle unit.

5. A nacelle as set forth in claim 4 wherein the removable covering consists of several parts interconnected by hinges and having vent slots.

6. An airplane of the character set forth in claim 1 wherein the frame is connected with the wing bottom at three points, the said three points forming a triangle, whose base line is towards the engine.

7. In an airplane, an airplane wing, a supporting frame attached to the bottom surface of said wing and extending in the direction of flight, one end of said supporting frame extending beyond the wing edge and forming the engine supporting base, a streamlined covering for the supporting frame and engine merging into the wing surface and forming a separate nacelle and the engine bed or base forming part of the supporting frame occupying a substantially lowered position beneath the wing and the frame being connected with the wing bottom only, the wing central portion being developed as a box girder with two longitudinal lateral beams which serve for the connection of the engine supporting frame, said frame being connected to the lateral beams at three points, forming an isosceles triangle, two connecting points lying on the beam close to the engine.

8. In an airplane, an airplane wing, a supporting frame attached to the bottom surface of said wing and extending in the direction of flight, one end of said supporting frame extending beyond the wing edge and forming the engine supporting base, a streamlined covering for the supporting frame and engine merging into the wing surface and forming a separate nacelle and the engine bed or base forming part of the supporting frame occupying a substantially lowered position beneath the wing and the frame being connected with the wing bottom only, the frame being connected with the wing bottom at three points, the said three points forming a triangle, whose base line is towards the engine, the bottom wall of the nacelle being conically shaped and tapered away from the engine, said bottom wall further merging into the wing bottom surface at a considerable distance from the top connection of the triangle.

9. A streamlined nacelle as above described, having ventilation openings, said ventilation openings being designed as air outlet nozzles, said nozzles extending from the nacelle wall towards the interior of the nacelle and substantially located in the direction of flight.

10. A streamlined nacelle of the character set forth in claim 9 wherein the outward wall of the nozzles is formed directly by the streamlined nacelle wall, the inward wall of the nozzles being formed by an extension of the nacelle wall part bordering the nozzle, said extension running in the direction of flight and being curved inwards.

11. An airplane of the character set forth in claim 1 wherein the wing has a central supporting element, said central element including longitudinal stays with cross walls connecting said stays at regular intervals, detachably arranged front and rear edges, said edges being sub-divided in the direction of the wing span in proportion to the arrangement of said transverse members, the engine supporting frame and the nacelle being smaller than a wing portion of equal length with the cross wall intervals and being attached to a wing portion between its cross walls.

12. An airplane of the character set forth in claim 1 wherein the wing has a central supporting element, said central element including longitudinal stays with cross walls connecting said stays at regular intervals, detachably arranged front and rear edges, said edges being sub-divided in the direction of the wing span in proportion to the arrangement of said transverse members, the engine supporting frame and the nacelle being smaller than a wing portion of equal length with the cross wall intervals and being attached to a wing portion between its cross walls, the upper wall of the nacelle being connected to the detachable wing edge and fairing into the latter.

13. In an airplane provided with a wing, an airplane engine, a supporting frame for the engine attached directly to the wing structure in its bottom plane by means constituting the sole support for said frame, one end of said frame extending beyond the edge of the wing and the engine being disposed so as to be readily accessible on said extended end portion and substantially below the level of the wing chord, and a detachable nacelle for the engine and supporting frame having a part extending beyond the wing edge and fairing into the vertex thereof.

In testimony whereof, I have signed my name to this specification.

ADOLF ROHRBACH.

CERTIFICATE OF CORRECTION.

Patent No. 1,893,098. January 3, 1933.

WILLIAM A. MURRAY, SR., ET AL.

It is hereby certified that error appears in the printed specification of the above numbered patent requiring correction as follows: Page 3, line 19, claim 5, for "and" read "the"; and that the said Letters Patent should be read with this correction therein that the same may conform to the record of the case in the Patent Office.

Signed and sealed this 28th day of February, A. D. 1933.

M. J. Moore,
Acting Commissioner of Patents.

(Seal)